United States Patent
Tanaka et al.

[11] Patent Number: 6,029,793
[45] Date of Patent: Feb. 29, 2000

[54] DAMPER DISK ASSEMBLY

[75] Inventors: Masanobu Tanaka, Hirakata; Hideki Hashimoto, Katano; Shiro Takahashi, Minoh, all of Japan

[73] Assignee: EXEDY Corporation, Neyagawa, Japan

[21] Appl. No.: 09/207,994

[22] Filed: Dec. 9, 1998

[30] Foreign Application Priority Data

Dec. 12, 1997 [JP] Japan ..................................... 9-343357
Dec. 12, 1997 [JP] Japan ..................................... 9-343358

[51] Int. Cl.[7] .............................. F16D 3/14; F16D 47/02; F16D 69/00
[52] U.S. Cl. .................. 192/213; 192/213.1; 192/213.22
[58] Field of Search ................................. 192/213, 213.1, 192/213.22; 464/68

[56] References Cited

U.S. PATENT DOCUMENTS

| | | | |
|---|---|---|---|
| 4,433,771 | 2/1984 | Caray | 192/106.2 |
| 4,475,640 | 10/1984 | Takeuchi et al. | 192/70.17 |
| 4,562,913 | 1/1986 | Cucinotta et al. | 192/106.2 |
| 4,969,855 | 11/1990 | Graton et al. | 464/63 |
| 5,813,915 | 9/1998 | Imanaka | 464/68 |
| 5,857,552 | 1/1999 | Hashimoto | 192/213.21 |

FOREIGN PATENT DOCUMENTS

| | | |
|---|---|---|
| 1213399 | 3/1960 | France . |
| 1396803 | 5/1964 | France . |
| 2000871 | 9/1969 | France . |
| 2225650 | 11/1974 | France . |
| 2242606 | 5/1975 | France . |
| 2 581 143 | 10/1986 | France . |
| 2 581 144 | 10/1986 | France . |
| 1 120 897 | 12/1961 | Germany . |
| 1 680 669 | 7/1970 | Germany . |
| 27 33 880 | 2/1978 | Germany . |
| 1-193415 | 8/1989 | Japan . |

*Primary Examiner*—Charles A. Marmor
*Assistant Examiner*—Tisha D. Waddell
*Attorney, Agent, or Firm*—Shinjyu An Intellectual Property Firm

[57] ABSTRACT

A clutch disk assembly 1 includes an output rotary member 4, an intermediate member 3, first springs 7, a damper 8, plates 12 and 13, and third springs 5. The intermediate member 3 is disposed radially outside the output rotary member 4. The first springs 7 are arranged between the output rotary member 4 and the intermediate member 3, and are circumferentially compressed when a hub and the intermediate member 3 rotate relatively to each other in a first stage of relative rotary displacement. A damper 8 is disposed between the output rotary member 4 and the intermediate member 3, and includes second springs 10 that are not compressed in the first stage of relative rotary displacement but are compressed in a second stage of relative rotary displacement. The torsion angle corresponding to the second stage is larger than a torsion angle corresponding to the first stage. The plates 12 and 13 are arranged on the axial side of the intermediate member 3. The third springs 5 circumferentially and elastically couple the intermediate member 3 to the plates 12 and 13. The above configuration suppresses a jumping phenomenon between the first and second stages.

12 Claims, 10 Drawing Sheets

DAMPER DISK ASSEMBLY

BACKGROUND OF THE INVENTION

A. Field of the Invention

The invention relates to a damper disk assembly, and particularly a damper disk assembly for transmitting a torque and for absorbing and damping a torsional vibration.

B. Description of the Background Art

A clutch disk assembly used in a clutch mechanism in, for example, an automotive vehicle has a clutch function for releasable engagement with a flywheel, and also has damper capabilities that allow it to dampen torsional vibration. The clutch disk assembly includes a clutch coupling portion (friction surface portions), input plates fixed to the clutch coupling portion, a hub disposed radially inside the input plates, and elastic members elastically coupling the input plates to a flange of the hub in a circumferential direction. When the clutch coupling portion is biased toward the flywheel, torque is transmitted from the flywheel. Torque is transmitted to the hub via the elastic members, and then is output to a shaft extending from the transmission. When variations in torque of the engine are transmitted to the clutch disk assembly, relative rotation occurs between the input plates and the hub. As a result, the elastic members are circumferentially compressed. The clutch disk assembly further includes a friction mechanism that is arranged between the input plates and the hub for generating a frictional resistance when the relative rotation occurs therebetween. The friction mechanism includes a plurality of washers and a biasing member.

In a clutch disk assembly of a hub-separated type, the flange is separated from the hub, and is used as an intermediate member. The hub and the intermediate member are circumferentially coupled together by elastic members having a lower rigidity. In this clutch disk assembly, a maximum torsional angle between the input plates and the hub can be increased, and torsional characteristics can have first and second stages of low and high rigidities, respectively.

In a torsional vibration system defined by the clutch disk assembly, the transmission and other members, normal vibrations in rotation speed of the engine continuously cause collisions between gear teeth of connecting gears in the transmission, and thereby cause noises. For reducing the torsional vibration and associated gear noises, it is necessary to provide the elastic members with a reduced spring constant so that there is a low rigidity in the first dampening stage. However, for damping the torsional vibration such as a low frequency vibration, which causes a much larger angle of relative rotation in the clutch disk assembly, it is necessary to increase a spring constant of the elastic members functioning in the second stage of dampening. In the conventional device having such characteristics, a jumping phenomenon occurs. In other words, the operation angle jumps over the region in the first stage and enters the second stage, for example, when a torque variation is supplied during idling. The jumping phenomenon is caused by oscillations in the transmission of the inertia with respect to, the elastic members that are provided in the clutch disk assembly for the second stage of the dampening characteristics. This causes gear collision to a much higher extent than the normal gear collision due to excessive rotational variations.

SUMMARY OF THE INVENTION

One object of the present invention is to suppress a jumping phenomenon that sometimes occurs between first and second stages of dampening in a damper mechanism.

Another object of the present invention is to provide a simple structure that can provide an intermediate rigidity between stages of the torsion vibration dampening in a damper mechanism.

In accordance with one aspect of the present invention, a damper disk assembly includes a hub and first circular plate member disposed radially outside the hub. A first elastic member is operably disposed between the hub and the first circular plate member. The first elastic member is configured for circumferential compression in response to relative rotary displacement between the hub and the first circular plate member in a first stage of the relative rotary displacement. A damper is disposed between the hub and the first circular plate member. The damper has a second elastic member configured such that the second elastic member undergoes compression in a second stage of the relative rotary displacement but generally does not undergo compression in the first stage of the relative rotary displacement. A torsion angle corresponding to the second stage is larger than a torsion angle corresponding to the first stage. A second circular plate member is axially opposed to the first circular plate member and a third elastic member circumferentially and elastically couples the first and second circular plate members together. The third elastic member has a spring constant larger than that of the first elastic member and that of the second elastic member.

In the above damper disk assembly, the first elastic member is circumferentially compressed between the hub and the first circular plate member when the hub and the second circular plate member rotate relatively to one another through a small torsion angle. When the torsion angle increases, the second elastic member is circumferentially compressed between the hub and the first circular plate member so that characteristics of a high rigidity are exhibited. When the torsion angle further increases, the third elastic member is circumferentially compressed between the first and second circular plate members so that characteristics having a further high rigidity are exhibited. Since the damper disk assembly described above can provide an intermediate rigidity owing to the operation of the second elastic member between the operations of the first and second third elastic members, the jumping phenomenon due to the vibration during idling can be suppressed.

Preferably, the damper further includes an intermediate member engaged with the second elastic member and is circumferentially spaced from the hub by the first torsion angle.

Accordingly, when the first elastic member is compressed through the first torsion angle, the second elastic member comes into contact with the intermediate member, and the second elastic member is circumferentially compressed thereafter.

Preferably, the first circular plate member supports the circumferentially opposite ends of the second elastic member. The intermediate member supports circumferentially opposite ends of the second elastic member. The intermediate member is circumferentially spaced from the hub by the first torsion angle.

Preferably, a gap corresponding to the second torsion angle is larger than a gap corresponding to the first torsion angle. The gap corresponding to the second torsion angle is formed circumferentially between the hub and the first circular plate member.

Accordingly, when the torsion angle between the hub and the second circular plate member exceeds the second torsion angle, the second elastic member is no longer compressed, and thereafter the third elastic member will be compressed between the intermediate member and the second circular plate member. In the damper disk assembly, since the second elastic member is not compressed in the third stage, breakage or damage to the second elastic member can be suppressed.

Preferably, the hub is provided with a plurality of first teeth that extend radially outward. The intermediate member is provided at its inner periphery with a plurality of second teeth circumferentially spaced from the first teeth by the first torsion angle, respectively. The first circular plate member is provided at its inner periphery with a plurality of third teeth circumferentially spaced from the first teeth by a second torsion angle, respectively, and the second torsion angle is larger than the first torsion angle.

Accordingly, stop portions between the hub and the intermediate member are defined by the first and second teeth. Stop portions between the hub and the first circular plate member are defined by the first and third teeth. Since the stop portions are formed of gear teeth that can come into circumferential contact with each other, the structure can be simple.

Preferably, the intermediate member has a plate-like shape formed with an annular portion, and an engagement portions that extends radially outward from the annular portion engaging circumferentially opposite ends of the second elastic member. The intermediate member further includes a plurality of second teeth extending radially inward from the annular portion.

Accordingly, the intermediate member has the plate-like form, and the respective portions thereof have bent structures so that the whole structure can be simple.

Preferably, the second elastic member is formed with a pair of springs located at axially offset positions for parallel operation between the intermediate member and the first circular plate member.

Since the second elastic member is formed of the pair of springs located at the axially shifted positions, a relatively large rigidity can be produced in the second stage.

In accordance with another aspect of the present invention, a damper disposed between first member and a second member the first and second members being relatively rotatable with respect to one another within a predetermined angle. The damper includes a pair of seats that extend axially, and engage the first member for allowing transmission of a torque therebetween. A pair of elastic members are disposed between the paired seats, and located next to each other with respect to an axial direction of the first and second members. A plate having an annular portion is engaged with the second member for allowing transmission of a torque therebetween. A receiver portion extends from the annular portion for receiving the pair of seats and the pair of elastic members.

The damper is formed of the paired seats, the paired elastic members and the plate, and thus has a simple structure. In particular, the damper includes the paired elastic members at the axially shifted positions, and the paired seats are arranged on the circumferentially opposite sides of the elastic members. Therefore, the damper can exhibit a relatively high rigidity.

Preferably, the receiver portion is formed with a pair of contact portions that contact respective circumferentially outer sides of the seats. Therefore, the plate transmits the torque through the paired contact portions to the paired seats and the paired elastic members.

Preferably, the receiver portion has a projecting portion that extends radially outward from the annular portion. The projecting portion is configured to support the paired seats and the paired elastic members from a first axial side thereof. The projecting portion is further formed with a pair of contact portions extending axially from the circumferentially opposite sides of the projected portion.

In the damper, the projecting portion extends from the annular portion, and the paired contact portions extend from the projecting portion. The paired contact portions have simple structures formed, for example, by bending them with respect to the projecting portion.

Preferably, the receiver portion further has a holding portion extending axially from the radially outer side of the projected portion and supporting radially outer sides of the paired elastic members and the paired seats.

In the damper, the holding portion extends from the projected portion, and supports the radially outer sides of the paired elastic members and the paired seats. The holding portion has a simple structure formed by bending the same with respect to the projected portion.

Alternatively, a cap is engaged with the first member. The cap is immobile toward a second axial side with respect to the first member, and the cap supports the second axial sides of the paired elastic members and the paired seats.

In the alternate configuration of the damper, the cap restricts movement of the paired elastic members and the paired caps toward the second axial side.

Preferably, the paired contact portions extend over the entire axial length of the paired seats and the plate further has a restricting portion extending circumferentially from the axial ends of the paired contact portions. The plate is disposed on the second axial side with respect to the paired elastic members and the paired seats.

In the damper, the restricting portion restricts the movement of the paired elastic members and the paired seats toward the second axial side. The restricting portion is formed by bending the same with respect to the contact portion, and thus has a simple structure. Further, the paired seats, the paired elastic members and the plate in the damper can be handled as a preassembly in a cassette form, which allows easy attachment to associated elements.

Preferably, the paired elastic members are coil springs and each of the paired seats has a main body extending in the axial direction and fitted portions extending from the main body. The fitted portions extend into the paired elastic members, respectively.

In the damper, the coil springs are axially retained by the fitted portions of the paired seats, where the paired seats extend into the springs such that interference between the coil springs is suppressed.

The damper according to the present invention is formed of the paired seat, the paired elastic members and the plate, and thus has a simple structure. In particular, the paired elastic members are located at the axially shifted positions, and the paired seats are arranged on the circumferentially opposite sides of the elastic member pair. Therefore, the damper can exhibit a relatively high rigidity.

DESCRIPTION OF THE PREFERRED EMBODIMENTS

First Embodiment

Figure 1:
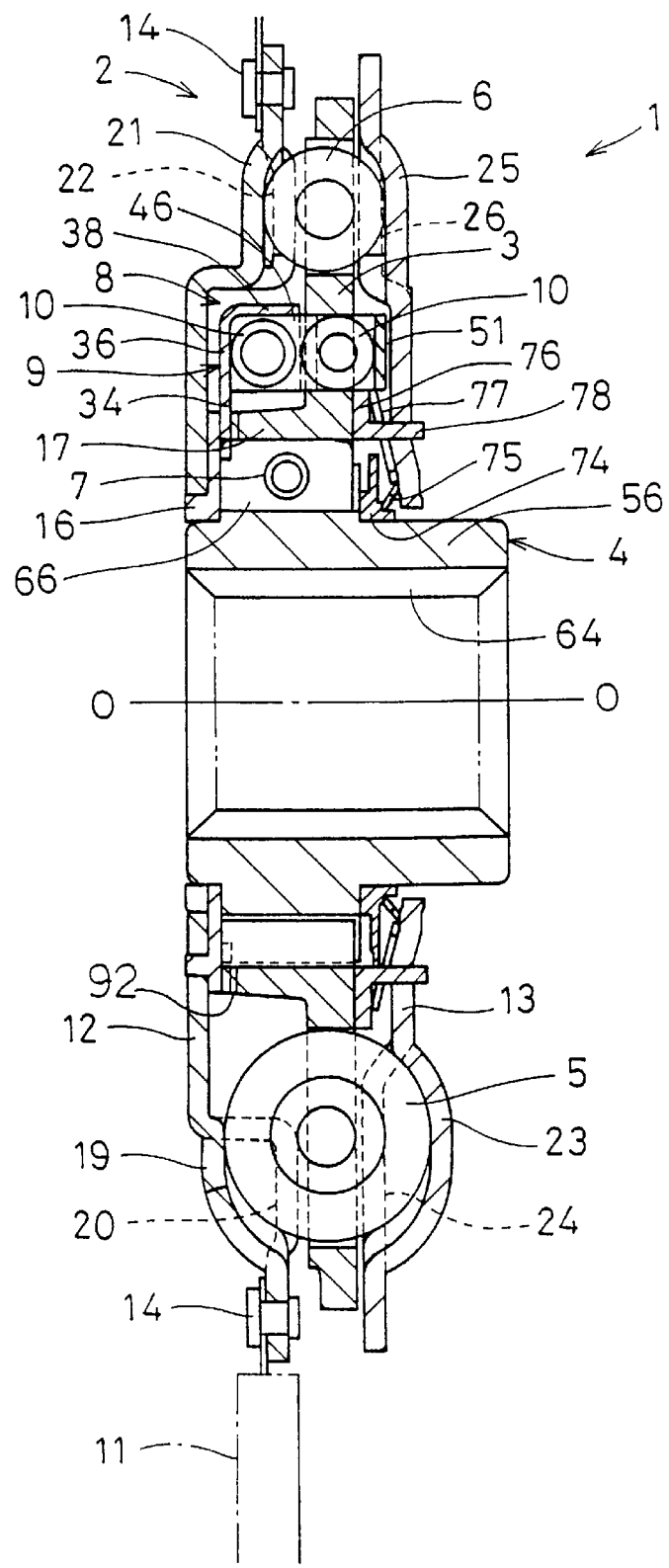
FIG. 1 is a schematic cross section of a clutch disk assembly of an embodiment of the invention.
Figure 2:
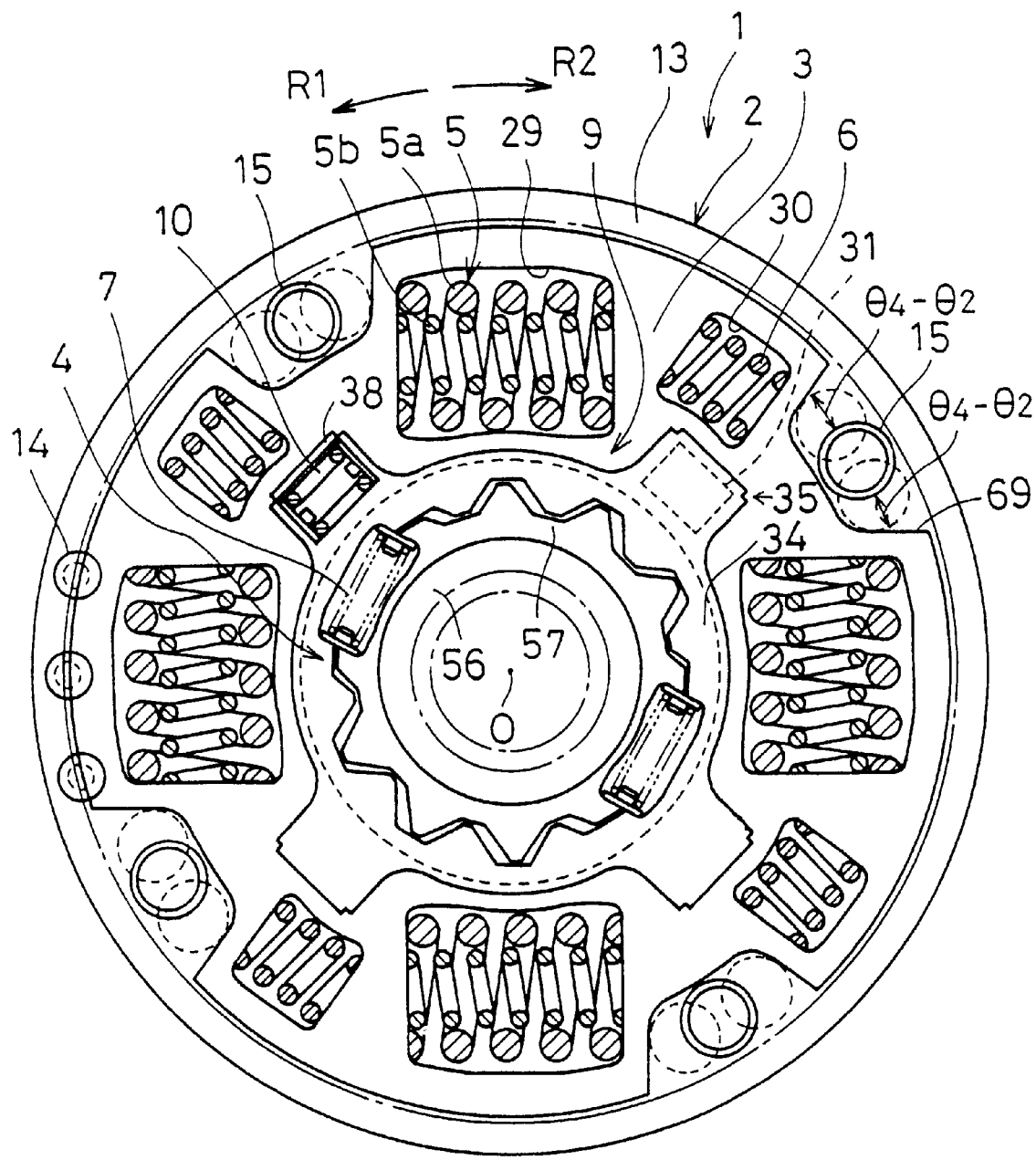
FIG. 2 is a plan of the clutch disk assembly with a plate removed.

FIGS. 1 and 2 show a clutch disk assembly 1 in accordance with one embodiment of the invention. The clutch disk assembly 1 is used in a clutch mechanism in an automotive vehicle. A flywheel (not shown) is disposed on the left side of the clutch disk assembly 1 in FIG. 1, and a transmission (not shown) is disposed on the right side in FIG. 1. In the following description, the left side in FIG. 1 is referred to as a "first axial side", and the right side in FIG. 1 is referred to as a "second axial side". 0—0 in FIG. 1 represents a rotation axis of the clutch disk assembly 1. A rotation direction R1 in FIG. 2 is a direction of rotation of the flywheel and the clutch disk assembly 1, and a rotation direction R2 is a reverse direction.

The clutch disk assembly 1 is basically formed of an input rotary member 2, an intermediate member 3, an output rotary member 4, third springs 5, fourth springs 6, second springs 10 and a damper 8. The input rotary member 2 is a member receiving a torque from the flywheel (not shown). The output rotary member 4 in this embodiment is a hub that is configured for connection to the shaft (not shown) of a transmission (not shown) such that the output rotary member 4 may slide in an axial direction (along the axis 0—0) but rotates together with the shaft. The intermediate member 3 is disposed between the input rotary member 2 and the output rotary member 4. The third and fourth springs 5 and 6 are provided for circumferentially and elastically coupling the input rotary member 2 and the intermediate member 3 together. First springs 7 are provided for circumferentially and elastically coupling the intermediate member 3 and the output rotary member 4 together. The damper 8 is a mechanism disposed between the output rotary member 4 and the intermediate member 3 in parallel with the first springs 7, as is more clearly shown in FIG. 1.

Structures of various portions of the clutch disk assembly 1 will be described below more in detail.

The input rotary member 2 is basically formed of a friction portion 11 (clutch disk), a first plate 12 and a second plate 13.

The friction portion 11 is an annular member disposed near a friction surface of the flywheel. The friction portion 11 is basically formed of a pair of facings and a cushioning plate.

First and second plates 12 and 13 are circular or annular, and are axially spaced apart from each other by a predetermined distance. The outer peripheral portions of the first and second plates 12 and 13 are fixed together by a plurality of pins 15 that are circumferentially spaced from each other. Thereby, the first and second plates 12 and 13 are spaced from each other by a constant axial distance, and rotate together as a single unit. The cushioning plate is fixed to the outer peripheral portion of the first plate 12 by rivets 14.

The first plate 12 is provided with first receiver portions 19 which are circumferentially equally spaced from each other. Each first receiver portion 19 shaped to extend in the axial direction (as shown in FIG. 1), and includes first contact portions 20 (in phantom lines in FIG. 1) at its circumferentially opposite sides. The first contact portions 20 are circumferentially opposed to each other. The first plate 12 is also provided with a plurality of second receiver portions 21 that are spaced apart from one another in the circumferential direction. Each second receiver portion 21 is formed to extend slightly toward the first axial side, and has second contact portions 22 at circumferentially opposite sides thereof (shown in phantom lines in FIG. 1). The second contact portions 22 are circumferentially opposed to each other to contact opposite ends of the spring 6.

The second plate 13 is provided with a plurality of first receiver portions 23 which are circumferentially equally spaced from one another. The first receiver portions 23 are formed to correspond to the first receiver portions 19, respectively, and each have first contact portions 24 at its circumferentially opposite ends thereof. The second plate 13 is further provided with a plurality of second receiver portions 25 arranged in the circumferential direction. The second receiver portions 25 are formed to correspond to the second receiver portions 21, respectively, and each has second contact portions 26 at circumferentially opposite ends thereof. The first receiver portions 19 and 23 are longer in the circumferential and radial directions than the second receiver portions 21 and 25.

An annular bushing 16 is arranged on the inner periphery of the first plate 12. The bushing 16 is supported rotatably on the outer peripheral surface of a hub 56 of the output rotary member 4. Thereby, the input and output rotary members 2 and 4 are radially positioned with respect to each other. The bushing 16 is in contact with the surfaces, on the first axial side, of a flange 57 and outer teeth 58, as is described below.

The intermediate member 3 is a circular or annular member disposed axially between the first and second plates 12 and 13. The intermediate member 3 is larger in axial thickness than the first and second plates 12 and 13. The intermediate member 3 is provided with circumferentially extending first windows or apertures 29 as shown in FIG. 2. The first windows 29 are formed to correspond to the first receiver portions 19 and 23 in the plates 12 and 13. The intermediate member 3 is further provided with a plurality of second windows 30 disposed at space apart locations in the circumferential direction. The second windows 30 correspond to the second receiver portions 21 and 25.

The third springs 5 are disposed in the first windows 29. Each third spring 25 is a combination of large and small coil springs 5a and 5b. The circumferentially opposite ends of each third spring 5 are in contact with the circumferentially opposite ends of the first window 29 and the first contact portions 20 and 24 of the plates 12 and 13. The third springs 5 are prevented from moving radially outward and axially outward by the receiver portions 19 and 23.

The fourth springs 6 are disposed in the second windows 30, respectively. Each fourth spring 6 is a coil spring as can be seen from FIG. 2. The circumferentially opposite ends of the fourth spring 6 are in contact with the circumferentially opposite ends of the corresponding second window 30. The circumferentially opposite ends of the fourth spring 46 are spaced from the contact portions 22 and 26 by torsion angles of $(\theta_3-\theta_2)$, respectively, as indicated in the schematic drawing FIG. 6.

The intermediate member 3 is provided at its outer periphery with a plurality of circumferential recesses 69. Each recess 69 extends in the circumferential direction, and the pins 15 extend through the recesses 69, respectively. Each pin 15 is spaced from each of the circumferentially opposite ends of the corresponding recess 69 by a fourth torsion angle ($\theta_4 - \theta_2$).

The intermediate member 3 is provided with third windows 31 that are located between adjacent first windows 29 and radially inward from the second windows 30. Each third window 31 has a nearly rectangular form extending in the circumferential direction.

The intermediate member 3 is provided at its inner peripheral portion with a cylindrical portion 17 extending toward the first axial side. The cylindrical portion 17 is provided with a plurality of second inner teeth 70 that extend radially inward. Each second inner tooth 70 has an R1-side surface 71 (its forward side in the rotating direction R1), and has an R2-side surface 72 (its rearward side).

Figure 3:
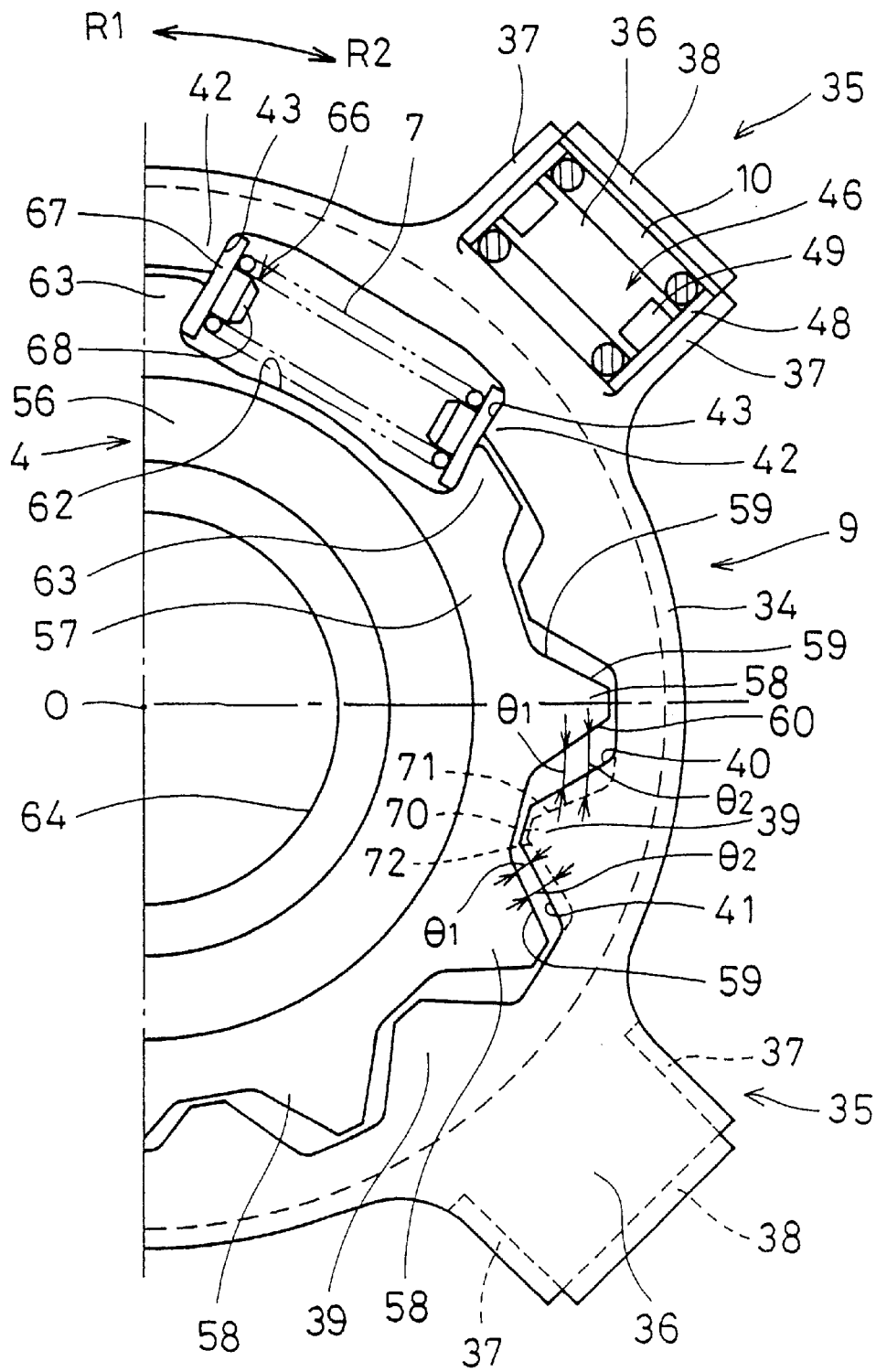
FIG. 3 is a fragmentary plan of the plate 9.

The output rotary member 4 is basically formed of a cylindrical boss 56 extending in the axial direction. The boss 56 extends through the central apertures of the plates 12 and 13. The boss 56 is formed with a flange 57 extending radially outward. The flange 57 has many features which correspond to, and interacts with features of the cylindrical portion 17 of the intermediate member 3. The flange 57 is formed with a plurality of outer circumferential teeth 58 that extend radially outward. The outer circumferential teeth 58 extend circumferentially between the second inner circumferential teeth 70 defining a gap therebetween, the gap being a predetermined angle measured from corresponding circumferential sides of the teeth 58 and the teeth 70, as shown in FIG. 3. On a side corresponding to the rotational direction R1 of each of the outer circumferential teeth 58 a surface 59 is formed. Further, on a side corresponding to the rotational direction R2 a surface 60 is defined on the teeth 58. An outer circumferential edge of the flange 57 is formed with to diametrically opposing recesses 62. The outer circumferential teeth 58 are formed between the recesses 62. Circumferential sides of the recesses 62 are formed with contacting portions 63.

In the next section, a damper 8 is described. The damper 8 includes a plate 9 and a second spring 10. The plate 9 is an annular member as shown in FIGS. 1 and 3, and is disposed between a first plate 12 and the intermediate member 3. The plate 9 is formed with an annular member 34 and an engagement portion 35. An inner circumferential edge of the annular member 34 is formed with a plurality of the first inner circumferential teeth 39 extending radially inward. The first inner circumferential teeth 39 are wider in circumferential direction than the second inner circumferential teeth 70, and extend beyond circumferential sides of the second inner circumferential teeth 70. Also the first inner circumferential teeth 39 extend between the outer circumferential teeth 58, and are configured to contact in circumferential direction, the outer circumferential teeth 58 in response to relative rotation therebetween. The rotational direction side R1 of the first inner circumferential teeth 39 are formed with a surface 40, and the rotational direction side R2 is formed with a surface 41.

A gap of a first torsional angle $\theta_1$ is defined between the outer circumferential teeth 58 and the first inner circumferential teeth 39 on both circumferential sides (when there is no torque applied to the clutch disc assembly). The gap corresponding to the first torsional angle $\theta_2$ is provided between the R1 side surface 59 of the outer circumferential teeth 58 and the R2 side surface 41 of the first inner circumferential teeth 39. The same gap having an angle $\theta_1$ is defined between the R2 side surface 60 of the outer circumferential teeth 58 and the R1 side surface 40 of the first inner circumferential teeth 39.

A gap having the second torsional angle $\theta_2$ is formed between the outer circumferential teeth 58 and the second inner circumferential teeth 70 on both circumferential sides thereof. Specifically, the gap with the second torsional angle $\theta_2$ is provided between the R1 side surface 59 of the outer circumferential teeth 58 and the R2 side surface 72 of the second inner circumferential teeth 70. As well, a gap with the second torsional angle $\theta_2$ is defined between the R2 side surface 60 of the outer circumferential teeth 58 and the R1 side surface 71 of the second inner circumferential teeth 70 respectively.

It should be understood that the various angles $\theta_1$, and $\theta_2$, are relative angles that change in response to the relative rotation of the various gear teeth. In FIG. 3, the clutch disk assembly is in a state where there is no torque applied. In this condition, the first torsional angle $\theta_1$, on the R1 side of each tooth 39 is larger than the angle $\theta_1$, the R2 side of the teeth 39, with respect to the surfaces of the outer circumferential teeth 58. Further, as in FIG. 3, the second torsional angle $\theta_2$ is larger on the R1 side of each of the gear teeth 70 that on R2 side of each of the gear teeth 70, with respect to the outer circumferential teeth 58. Further, the combined angular measurement of the two second torsional angles $\theta_2$ on each side of any one gear tooth 70 is larger than a corresponding combination of to first torsional angles $\theta_1$.

Also, the forth torsional angle $\theta_4$ described above is larger than the third torsional angle $\theta_3$ and the third torsional angle $\theta_3$ and the forth torsional angle $\theta_4$ each larger than the second torsional angle $\theta_2$ respectively.

Further, an inner circumferential portion of the plate 9 extends between a bushing 16 and the cylindrical portion 17 in axial direction. A friction washer 92 is disposed between the annular portion 34 of the plate 9 and a surface edge on an engine side of the cylindrical portion 17. The friction washer 92 is a member that generates friction resistance between the plate 9 and the intermediate rotational member 3 when undergoing relatively rotation. The friction washer 92 has a high friction coefficient the same as a second friction member 76, described below, and is disposed between the plate 9 and the cylindrical portion 17 by a biasing member 77 described below.

The engagement portion 35, which is depicted in FIGS. 2, 3, 4 and 5, supports the second spring 10, and each engagement portion 35 includes a protrusion 36, contacting portions 37 and holding portion 38. A plural number of the protrusions 36 are formed, the protrusions 36 extend radially outward from the annular portion 34. The holding portions 38 extend radially outward from a radial outer edge of the protrusions 36. The contacting portions 37 and the holding portions 38 are bent such that extend in an axial direction toward the intermediate member 3. A predetermined space is defined by the protrusions 36, contacting portions 37 and holding portions 38 within the engagement portions 35. The predetermined space coincides with the third window 31 of the intermediate member 3.

Figure 4:
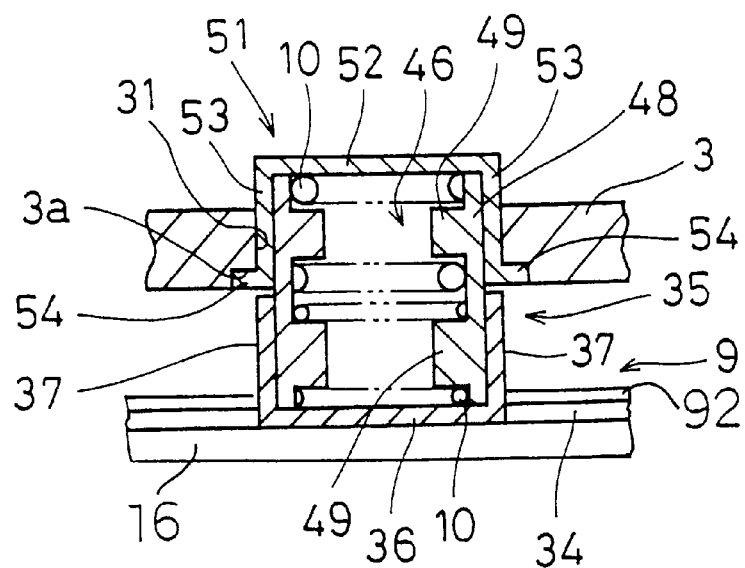
FIG. 4 is a cross section of second springs.

In each third window 31 and the corresponding engagement portion 35, there are arranged a pair of seats 46 and the pair of second springs 10. The second springs 10 are coil springs as shown in FIG. 4, and are disposed at the axially spaced positions, respectively. One of the paired second springs 10 is located within the engagement portion 35, and the other is, disposed in the third window 31.

The seats 46 support the circumferentially opposite ends of the paired second springs 10, and also function as members for axially positioning the paired second springs 10. Each seat 46 has a rectangular main body 48 extending in the axial direction. The main bodies 48 are in contact with the circumferentially opposite ends of each second spring 10. The circumferentially outer side of the main body 48 of each seat 46 is supported by the engagement portion 35 and the third window 31. The seat 46 is provided with fitting portions 49 extending from the main body 48 into the second springs 10, respectively. The fitting portion 49 prevents disengagement of the second spring 10 from the seat 46, and axially positions the same. Therefore, axial interference between the paired second springs 10 is suppressed.

Figure 5:
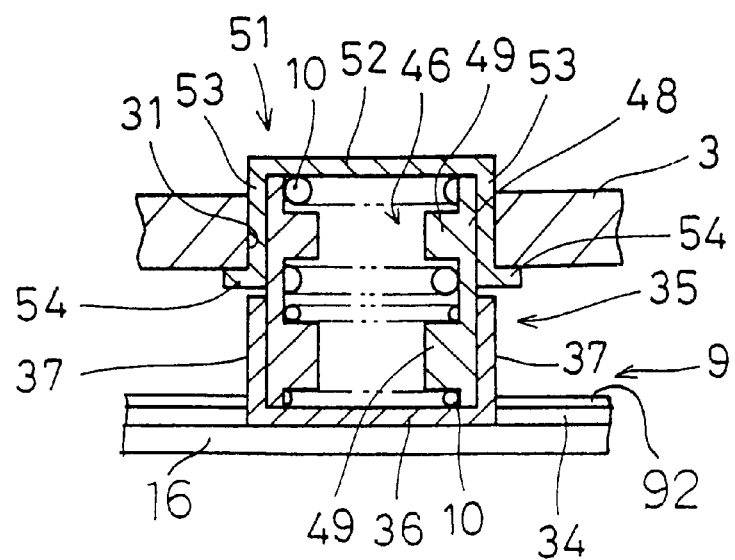
FIG. 5 shows a modification of the structure in FIG. 4.

A cap 51 is engaged with the intermediate member 3 for supporting the paired second springs 10 and the paired seats 46 from the second axial side. As can be seen in FIGS. 4 and 5, the cap 51 is made of a plate material that is deformed to the shape depicted. The cap 51 includes a holding portion 52 engaged with the sides of the pair of second springs 10 and the pair of seats 46 from the second axial side. Engagement portions 53 extend from the holding portion 52 toward the first axial side, and extend on circumferentially opposite sides of the third window 31, i.e., between the circumferentially opposite edges of the third window 31 and the circumferentially outer side surfaces of the seats 46, respectively. Further, engagement portions 54 extend circumferentially away from each other and are in contact with the surface of the intermediate member 3 on the first axial side. The engagement portions 54 prevent the cap 51 from moving toward the first axial side with respect to the intermediate member 3. As a result, the holding portion 52 of the cap 51 restricts the movement of the paired second springs 10 and the paired seats 46 toward the second axial side.

With reference now to FIG. 1, the assembly includes a first friction member 74 that is an annular member in contact with the surface of the flange 57 on the second axial side. The first friction member 74 is biased toward the flange 57 by a first biasing member 75 disposed between the first friction member 74 and the inner peripheral portion of the second plate 13.

A second friction member 76 is an annular member that is in contact with the surface, on the second axial side, of the inner peripheral portion of the intermediate member 3. The second friction member 76 has engagement arms 78 that are engaged relatively non-rotatable with respect to the second plate 13. The first and second friction members 74 and 76 are engaged circumferentially non-rotatably but axially movably with respect to one another. Thus, the first and second friction members 74 and 76 rotate together with the input rotary members 2, i.e., plates 12 and 13. A frictional resistance is generated between the first friction member 74 and the flange 57 and is smaller than that occurring between the second friction member 76 and the intermediate member 3.

The first, second, third and fourth springs 7, 10, 5 and 6 have the spring constants, each of which is smaller than that of the preceding one, with respect to the order given above.

The damper 8 can be attached to the intermediate member 3 and the output rotary member 4 from the first axial side. For this attachment, the caps 51, the paired seats 46 and the paired second springs 10 are attached in advance to the plate 9. Then, the caps 51 and other members supported on the plate 9 are fitted into the third windows 31 in the intermediate member 3.

Figure 6:
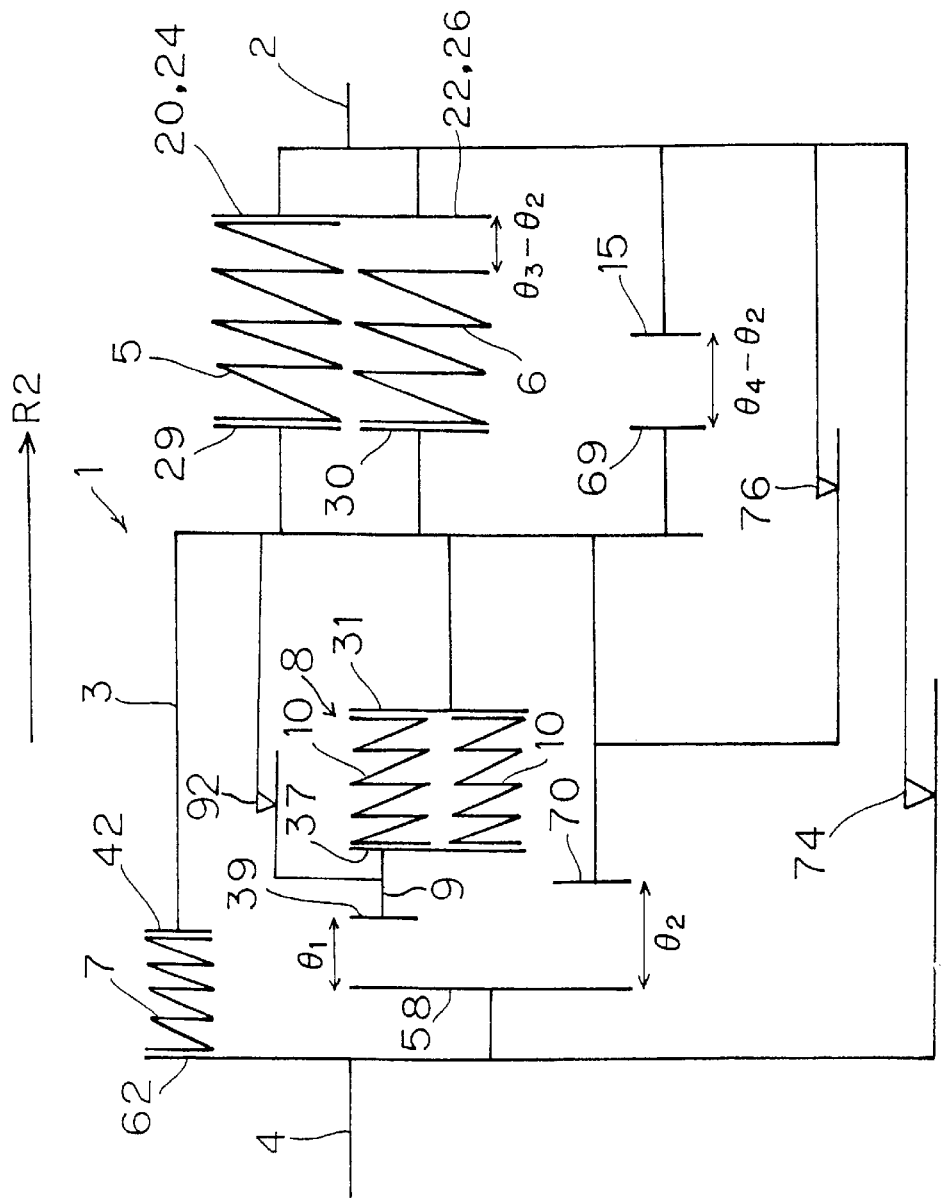
FIG. 6 is a mechanical circuit diagram of the clutch disk assembly.

FIG. 6 is a mechanical circuit diagram of the damper mechanism of the clutch disk assembly 1. This figure represents relationships between the various members during the torsion transmission through the damper in one direction. As can be seen from the figure, the damper 8 permits enhanced dampening characteristics not found-in the prior art. Further, the clutch disk assemblies 1 can be manufactured with or without the damper 8 depending on the required characteristics.

A torque transmitting operation of the clutch disk assembly 1 will be described below.

When the friction portion 11 of the input rotary member 2 is pressed against the flywheel (not shown), the clutch disk assembly 1 is supplied with a torque. The torque is transmitted successively through the first and second plates 12 and 13, third springs 5, intermediate member 3, paired second springs 10 and output rotary member 4. The torque is transmitted from the output rotary member 4 to the shaft (not shown) extending from the transmission (not shown).

When a torque variation of the engine is transmitted to the clutch disk assembly 1, torsional vibration, i.e., relative rotation occurs between the input rotary members 2 and the output rotary member 4 so that the third, fourth, second and first springs 5, 6, 10 and 7 are compressed.

Figure 7:
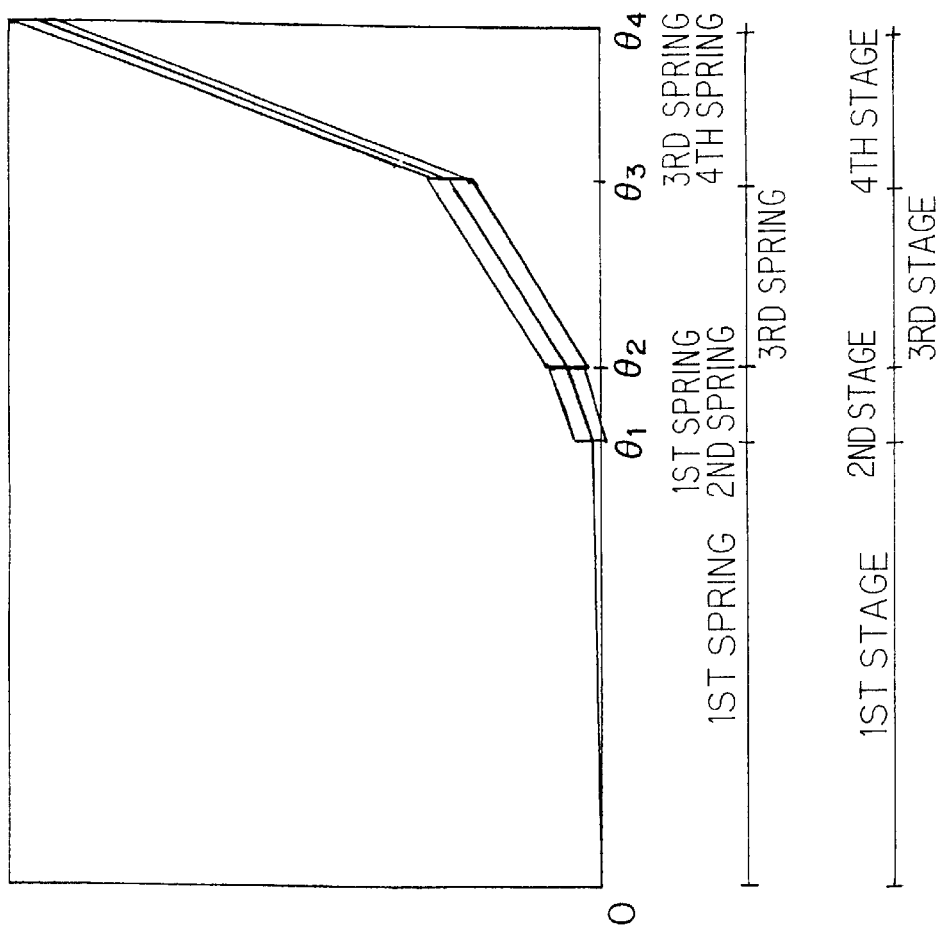
FIG. 7 is a diagram showing torsion characteristics of the clutch disk assembly.
Figure 8:
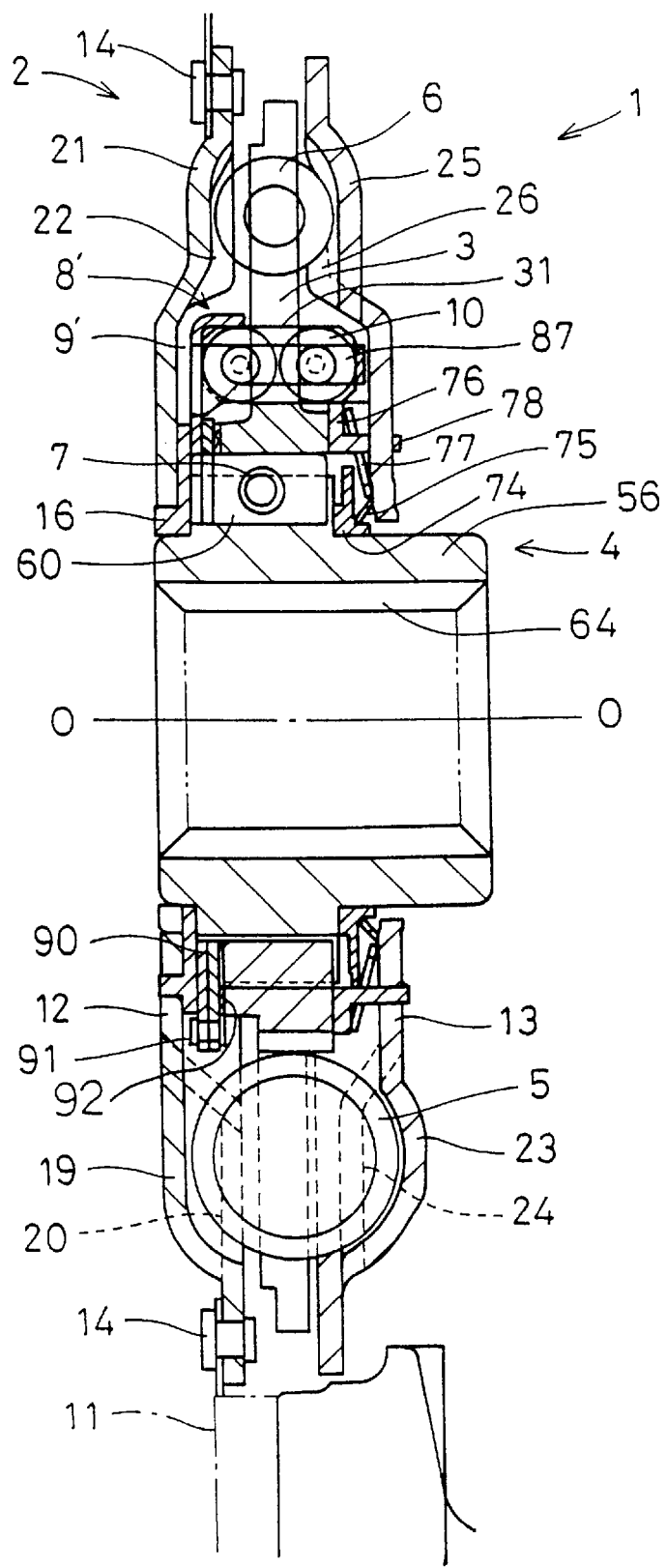
FIG. 8 is a schematic cross section of a clutch disk assembly of a second embodiment.
Figure 9:
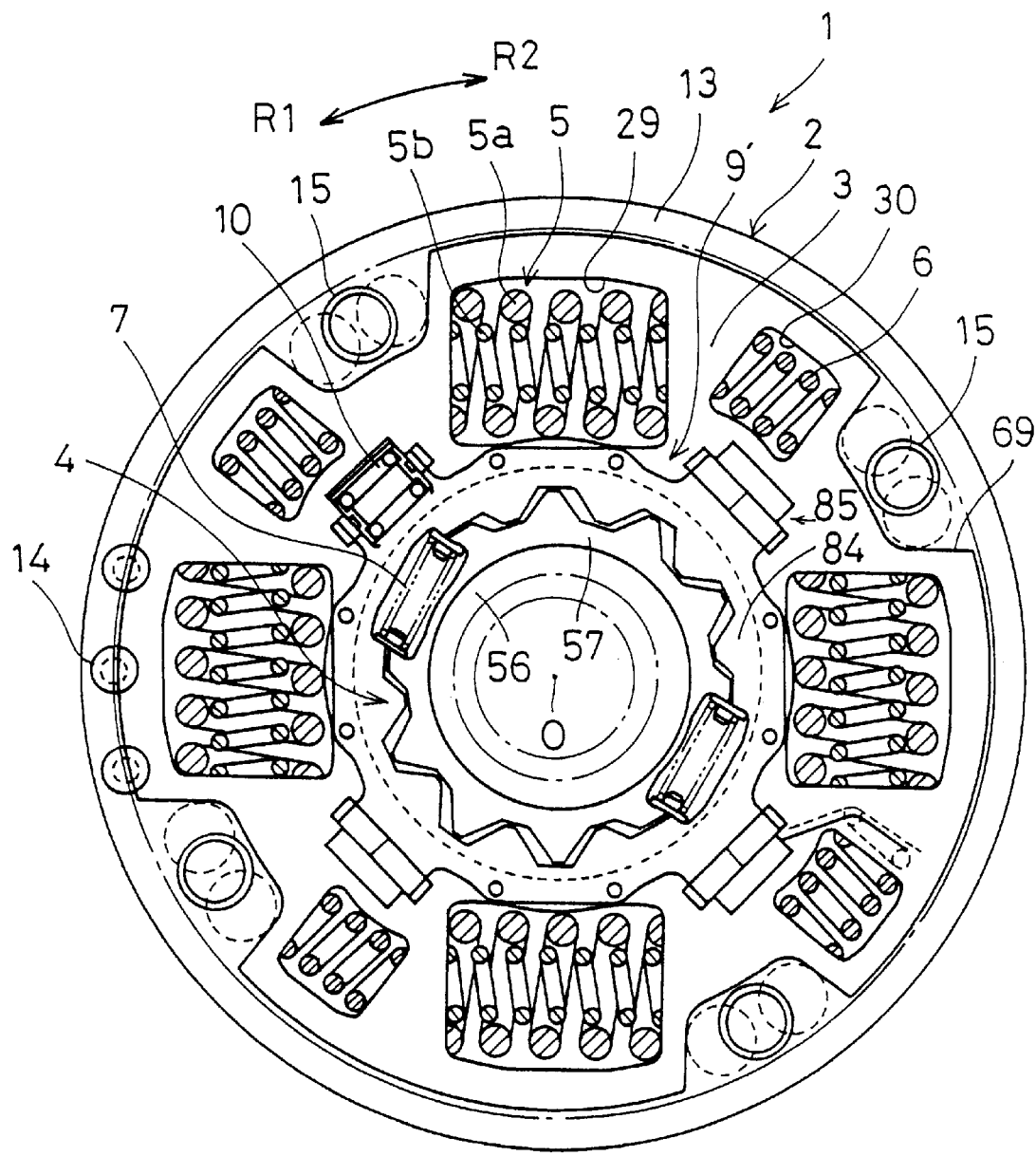
FIG. 9 is a plan showing the clutch disk assembly with a plate removed.
Figure 10:
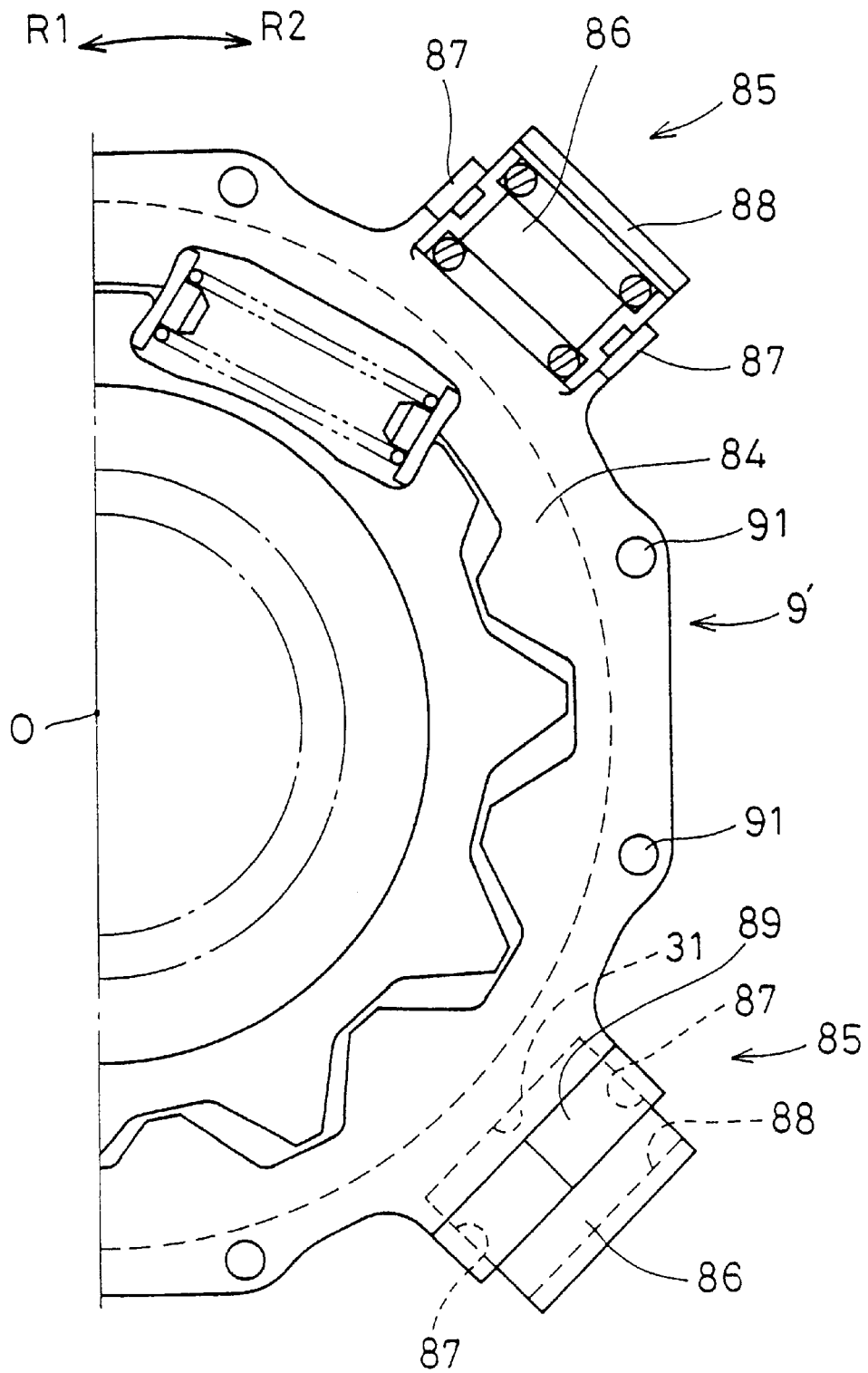
FIG. 10 is a fragmentary plan of a damper.
Figure 11:
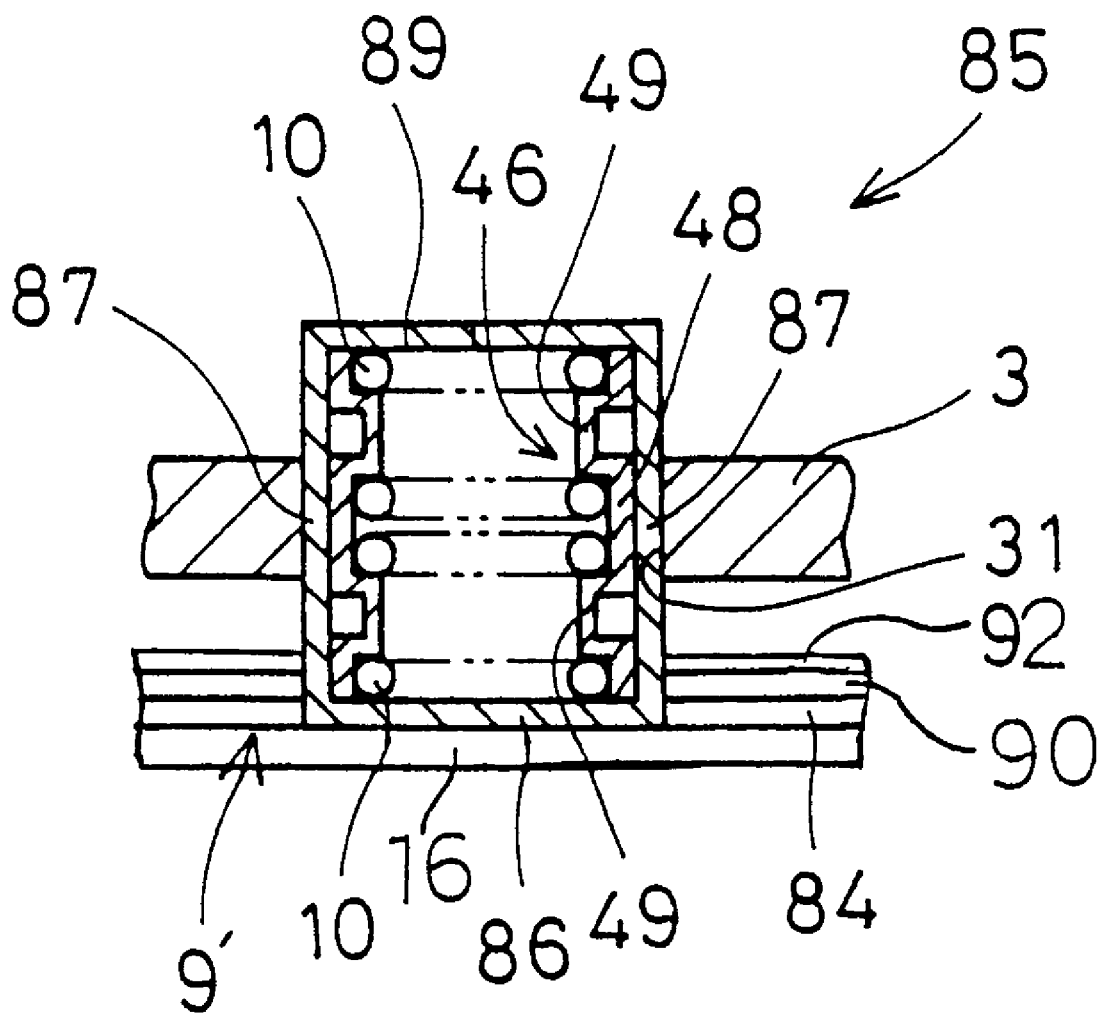
FIG. 11 is a cross section corresponding to FIG. 4.

The torsion operation of the clutch disk assembly 1 will now be described below with reference to a characteristic diagram of FIG. 7. In the following description, it is assumed that the input rotary members 2 are fixed to another stationary device (in operation they would be engaged with a flywheel), and the output rotary member 4 is twisted in the rotating direction R2 relatively to the input rotary members 2. Before the outer teeth 58 come into contact with the first inner teeth 39 and therefore the torsion angle is smaller than the first torsion angle $\theta_1$, the first springs 7 are primarily compressed in the circumferential direction so that a characteristic of a low rigidity is exhibited. In this first stage, a small frictional resistance occurs between the first friction member 74 and the flange 57 of the output rotary member 4. When relative rotary displacement between the input rotary member 2 and the output rotary member 4 increases such that the torsion angle therebetween increases to the first torsion angle $\theta_1$, the outer teeth 58 come into contact with the first inner teeth 39. Thereafter the first springs 7 and the paired second springs 10 are compressed in parallel between the output rotary member 4 and the intermediate member 3 in a second stage (see FIG. 7). In the second stage, the torsion angle is in a range between the angle $\theta_1$ and the angle $\theta_2$. In the second stage, each pair of the second springs 10 is compressed. Therefore, a characteristic of a relatively high rigidity is exhibited. While the torsion angle is between the angle $\theta_1$ and the angle $\theta_2$, the friction washer 92 slides between the plate. 9 and the intermediate member 3, and produces a large frictional resistance. Therefore, a characteristic of intermediate rigidity and a high hysteresis torque is exhibited in an intermediate region between the torsion angle $\theta_1$ and the angle $\theta_2$. When the torsion angle reaches the second torsion angle $\theta_2$, the outer teeth 58 come into contact with the second inner teeth 70, and thereafter the first and second springs 7 and 10 are no longer able to undergo further compression. Thus, the relative rotation between the output rotary member 4 and the intermediate member 3 stops, and thereafter the relative rotation further occurs with respect to the input rotary members 2 in a third stage, as in indicated in FIG. 7. Therefore, the third springs 5 are compressed, and sliding occurs between the intermediate member 3 and the second friction member 76. As a result, characteristics of high rigidity and large hysteresis torque are exhibited in a region between the torsion angles $\theta_2$ and the angle $\theta_3$, in the third stage. The fourth springs 6 start to be compressed at the torsion angle $\theta_3$, and thereafter a characteristic of a further increased rigidity is exhibited. When the pins 15 come into contact with the edges of recesses 69 at the torsion angle $\theta_4$, respectively, the relative rotation between the output rotary member 4 and the input rotary member 2 stops.

According to the torsion characteristics described above, the characteristic of a low rigidity and a small hysteresis torque is exhibited in the first stage where the, displacement is in a range smaller than the first torsion angle $\theta_1$. Therefore, gear noises during idling are suppressed. The characteristics of an intermediate rigidity is exhibited in the second stage between the angles $\theta_1$ and angle $\theta_2$, i.e., the region between the regions of the low and high rigidities. Therefore, the jumping phenomenon is suppressed. Particularly, the friction washer 92 causes a large friction, i.e., a high hysteresis torque in this intermediate region (second stage). This can effectively prevent the jumping phenomenon.

In this embodiment, the characteristic of an intermediate rigidity is achieved by the damper 8, which is formed of the plate 9, paired second springs 10 and paired seats 46 and thus has a simple structure.

The engagement portion 54 is engaged with a cavity 3a formed at the intermediate member 3 as shown in FIG. 4. However, alternatively, the cavity 3a may be eliminated, and the engagement portion 54 may be in contact with the end surface of the intermediate member 3 on the first axial side.

Second Embodiment

The clutch disk 1 shown in FIGS. 8 to 11 have the substantially same structure as the foregoing embodiment except for the damper 8. There are slight differences between the damper 8 in the first embodiment and the damper 8' in this second embodiment and therefore, only the damper 8' will be described below.

A plate 9' (similar to the plate 9 in the first embodiment) includes an annular portion 84 and a plurality of engagement portions 85 similarly to the foregoing embodiment. An annular reinforcing plate 90 is fixed to the inner peripheral portion of the plate 9' by rivets 91. The reinforcing plate 90 is fixed to the surface on the second axial side, and is in contact with the surfaces of the cylindrical portion 17 of the intermediate member 3 and the flange 57 on the first axial side. The reinforcing plate 90 has teeth similar to those of the plate 9', and can be in contact with the outer teeth on the hub side together with the plate 9'. Owing to increase in contact area between the teeth, wear and breakage are suppressed. In particular, the plate 9' has strength increased by the reinforcing plate 90.

In each engagement portion 85, a projected portion 86 extends radially outward from the annular portion 84. Contact portions 87 extend axially from the circumferentially opposite ends of the projected portion 86. The paired contact portions 87 extend through the third window 31 in the intermediate member 3, and have the axial tip ends that are bent to extend circumferentially inward toward each other. These tip ends of the contact portions 87 are welded together to form an axial holding portion 89. The paired second elastic members and the paired seats 46 have the same structures as those in the first embodiment. In this second embodiment, the axial holding portion 89 of the plate 9' is employed instead of the cap in the foregoing embodiment for restricting the movement of the paired second springs 10 and the paired seats 46 toward the second axial side. Each contact portion 87 has a shorter radial width than the seat 46.

Each edge of the third window 31 is in contact with a corresponding portion of each seat 46. Therefore, the third window 31 and the contact portion 87 engage a central portion of a corresponding seat 46.

The structure of the first inner teeth of the annular portion 84 as well as the relationship of the first inner teeth with respect to the other members are the same as those in the foregoing embodiment, and therefore will not be discussed below.

This embodiment can achieve excellent effects similarly to those of the foregoing first embodiment.

The invention is not restricted to the clutch disk assembly, and may be employed in other power transmitting devices.

According to the damper disk assembly of the invention, an intermediate rigidity can be exhibited by the operation of the second elastic member between the operations of the first and third elastic members. Therefore, the jumping phenomenon that may be caused by vibration during idling can be suppressed.

In the damper disk assembly according to the invention, the intermediate member forming the damper has a plate-like form, and respective portions thereof are formed by bending, thus providing a simple structure.

What is claimed is:

1. A damper disk assembly comprising:
   a hub(4);
   a first circular plate member (3) disposed radially outside said hub (4);
   a first elastic member (7) operably disposed between said hub (4) and said first circular plate member (3), said first elastic member (7) being configured for circumferential compression in response to relative rotary displacement between said hub (4) and said first circular plate member (3) in a first stage of said relative rotary displacement;
   a damper (8) disposed between said hub (4) and said first circular plate member (3), said damper (8) having a second elastic member (10) configured such that said second elastic member undergoes compression in a second stage of said relative rotary displacement but generally does not undergo compression in said first stage of said relative rotary displacement, a torsion angle ($\theta_2$) corresponding to said second stage being larger than a torsion angle ($\theta_1$) corresponding to said first stage;
   a second circular plate member (12,13) axially opposed to said first circular plate member (3);
   a third elastic member (5) circumferentially and elastically coupling said first and second circular plate members (12,13) together, and having a spring constant larger than that of said first elastic member (7) and larger than that of said second elastic member (10);
   an intermediate member (9) engaged with said second elastic member (10) and circumferentially spaced from said hub (4) by said first torsion angle ($\theta_1$); and
   wherein said first circular plate member (3) supports the circumferentially opposite ends of said second elastic member (10), and said intermediate member (9) supports the circumferentially opposite ends of said second elastic member (10).

2. The damper disk assembly according to claim 1, wherein a gap corresponding to said second torsion angle ($\theta_2$) is formed circumferentially between said hub (4) and said first circular plate member (3) and said gap corresponding to said second torsion angle ($\theta_2$) is larger than a gap corresponding to said first torsion angle ($\theta_1$).

3. A damper disk assembly comprising:

a hub (4);

a first circular plate member (3) disposed radially outside said hub (4);

a first elastic member (7) operably disposed between said hub (4) and said first circular plate member (3), said first elastic member (7) being configured for circumferential compression in response to relative rotary displacement between said hub (4) and said first circular plate member (3) in a first stage of said relative rotary displacement;

a damper (8) disposed between said hub (4) and said first circular plate member (3), said damper (8) having a second elastic member (10) configured such that said second elastic member undergoes compression in a second stage of said relative rotary displacement but generally does not undergo compression in said first stage of said relative rotary displacement, a torsion angle ($\theta_2$) corresponding to said second stage being larger than a torsion angle ($\theta_1$) corresponding to said first stage;

a second circular plate member (12, 13) axially opposed to said first circular plate member (3);

a third elastic member (5) circumferentially and elastically coupling said first and second circular plate members (12, 13) together, and having a spring constant larger than that of said first elastic member (7) and larger than that of said second elastic member (10);

an intermediate member (9) engaged with said second elastic member (10) and circumferentially spaced from said hub (4) by said first torsion angle ($\theta_1$);

wherein said hub (4) is provided with a plurality of first teeth (58) extending radially outward; and said intermediate member (9) is provided at its inner periphery with a plurality of second teeth (39) circumferentially spaced from said first teeth (58) by said first torsion angle ($\theta_1$), respectively, said first circular plate member (3) is provided at its inner periphery with a plurality of third teeth (70) circumferentially spaced from said first teeth (58) by a gap corresponding second torsion angle ($\theta_2$), respectively, and said second torsion angle ($\theta_2$) is larger than said first torsion angle ($\theta_1$); and said intermediate member (9) has a plate-like form, and has an annular portion, an engagement portion (35) extending radially outward from said annular portion and engaged with the circumferentially opposite ends of said second elastic member (10), and a plurality of second teeth (39) extending radially inward from said annular portion.

4. The damper disk assembly according to claim 3, wherein said second elastic member (10) includes a pair of springs located at axially shifted positions for parallel operation between said intermediate member (9) and said first circular plate member (3).

5. A damper (8) disposed between first member (3) and a second members (4), said first and second members being relatively rotatable with respect to one another within a predetermined angle, and said damper comprising:

a pair of seats (46) extending axially, and engaged with said first member (3) for allowing transmission of a torque therebetween;

a pair of elastic members (10) disposed between said paired seats (46), and located next to each other with respect to an axial direction of said first and second members; and a plate (9) having an annular portion (34) engaged with said second member (4) for allowing transmission of a torque therebetween, and a receiver portion (35) extending from said annular portion (34) for receiving said pair of seats (46) and said pair of elastic members (10).

6. The damper (8) as set forth in claim 5, wherein said receiver portion (35) is formed with a pair of contact portions (37) that contact respective circumferentially outer sides of said seat pair (46).

7. The damper (8) according to claim 6, wherein said receiver portion (35) has a projecting portion (36) extending radially outward from said annular portion (34), said projecting portion being configured to support said paired seats (46) and said paired elastic members (10) from a first axial side thereof, and said projecting portion further formed with a pair of contact portions (37) extending axially from the circumferentially opposite sides, of said projected portion (36).

8. The damper (8) as set forth in claim 7, wherein said receiver portion (35) further includes a holding portion (38) extending axially from the radially outer side of said projected portion (36), said holding portion (38) supporting radially outer sides of said paired elastic members (10) and said paired seats (46).

9. The damper (8) as set forth in claim 8, further comprising:

a cap engaged with said first member (3), said cap being immobile toward a second axial side with respect to said first member (3), and said cap supporting the second axial sides of said paired elastic members (10) and said paired seats (46).

10. The damper (8) as set forth in claim 8, wherein said paired contact portions (37) extend over the entire axial length of said paired seats (46); and said plate (9) further has a restricting portion (89) extending circumferentially from the axial ends of said paired contact portions (37), and said plate being disposed on the second axial side with respect to said paired elastic members (10) and said paired seats (46).

11. The damper (8) as set forth in claim 9, wherein said paired elastic members (10) are coil springs; and each of said paired seats (46) has a main body (48) extending in the axial direction and fitted portions (49) extending from said main body (48), said fitted portions extending into said paired elastic members (10), respectively.

12. The damper (8) as set forth in claim 10, wherein said paired elastic members (10) are coil springs; and each of said paired seats (46) has a main body (48) extending in the axial direction and fitted portions (49) extending from said main body (48), said fitted portions extending into said paired elastic members (10), respectively.

* * * * *